United States Patent [19]
Sato et al.

[11] Patent Number: 5,837,957
[45] Date of Patent: Nov. 17, 1998

[54] ELECTRIC DISCHARGE MACHINING APPARATUS

[75] Inventors: Tatsushi Sato; Yoshihito Imai; Tomoko Sendai; Hidetaka Miyake; Takashi Yuzawa; Takuji Magara, all of Tokyo, Japan

[73] Assignee: Mitsubishi Denki Kabushiki Kaisha, Tokyo, Japan

[21] Appl. No.: 807,866

[22] Filed: Feb. 26, 1997

[30] Foreign Application Priority Data

Feb. 27, 1996 [JP] Japan .................................. 8-039320
Jan. 16, 1997 [JP] Japan .................................. 9-065393

[51] Int. Cl.⁶ ...................................................... B23H 1/06
[52] U.S. Cl. ..................................... 219/69.15; 219/69.11
[58] Field of Search ............................. 219/69.13, 69.14, 219/69.15

[56] References Cited

U.S. PATENT DOCUMENTS

| | | |
|---|---|---|
| 3,796,852 | 3/1974 | Vlach . |
| 4,373,127 | 2/1983 | Haskett et al. ................ 219/69.15 |
| 4,924,051 | 5/1990 | Sebzda, Sr. . |
| 5,349,149 | 9/1994 | Shiraki et al. ................ 219/69.14 |
| 5,453,593 | 9/1995 | Seok-Yong et al. ............ 219/69.13 |

FOREIGN PATENT DOCUMENTS

| | | |
|---|---|---|
| 3539643 | 5/1987 | Germany . |
| 58-186532 | 10/1983 | Japan . |
| 1-97523 | 4/1989 | Japan . |
| 2-283667 | 11/1990 | Japan . |
| 4-75819 | 3/1992 | Japan . |

OTHER PUBLICATIONS

Petithumbert, J., "Elektroden aus dictem Graphit für funkenerosive Bearbeitung" in TZ. F. prakt. Metallbearbeitung, 1969, year 63, vol. 1, pp. 11–12.

Astract of SU 443,738, "Electrode tool material comprises nuclear pyrolitic graphite for use in electroerosion processes", Dec. 1981.

Asian Electrical–Machining Symposium '95 and Annual Meeting of Jseme by The Japan Society of Electrical–Machining Engineer, pp. 163–166, published Oct. 31, 1995.

*Primary Examiner*—Geoffrey S. Evans
*Attorney, Agent, or Firm*—Sughrue, Mion, Zinn, Macpeak & Seas, PLLC.

[57] ABSTRACT

An electric discharge machining apparatus in which at least either of a tool electrode or a workpiece is made of an anisotropic conductive material, includes, on a good conductive surface 20*b* of the anisotropic conductive material 2, a portion for connecting an isotropic conductive member 22. Electric discharge is generated on the good conductive surface 20*b* of the anisotropic conductive material 2. A conductive adhesive agent 23 is employed to bond the anisotropic conductive material 2 and the isotropic conductive member 22 to each other. The anisotropic conductive material is a pyrocarbon material. The pyrocarbon heat resolved carbon material is employed as a tool electrode material. Incombustible dielectric fluid, such as pure water, is employed as dielectric fluid. Moreover, there are provided apparatus for measuring voltage during electric discharge, apparatus for setting a threshold value for use to determine whether the electric discharge is normal electric discharge or abnormal electric discharge and apparatus for interrupting supply of a discharge current in a case where the measured discharge voltage is higher than the threshold value.

13 Claims, 13 Drawing Sheets

ELECTRIC DISCHARGE MACHINING APPARATUS

BACKGROUND OF THE INVENTION

1. Field of the Invention

The present invention relates to an electric discharge machining apparatus.

2. Description of the Related Art

Hitherto, copper and isotropic graphite have been employed as materials for manufacturing a tool electrode. In recent years, an attempt to employ a pyrocarbon material to form the tool electrode in order to prevent consumption of the electrode has been reported (for example, refer to document titled "EDM Characteristics of Heat Resolved Carbon Electrode" written by Uno and Okada, on p.p. 163 to 166 of Proceedings of Annual Meeting of the Japan Society of Electrical-Machining Engineers 1995).

However, there arises a problem in that an electric discharge process becomes excessively unstable if pyrocarbon is subject to the electric discharge process. Since the anisotropy of the foregoing material in the electric discharge machining process has not been considered, the present inventors energetically performed development and research, and found a fact that the anisotropy in the heat conductivity and electric conductivity must be considered when an anisotropic conductive material, such as the pyrocarbon is used when an electric discharge machining process is performed.

In a case where the pyrocarbon material is employed to form a tool electrode, there arises a problem in that the foregoing material is considerably expensive as compared with the conventional electrode materials.

SUMMARY OF THE INVENTION

The present invention has been made to eliminate the above difficulties with the conventional apparatus, and therefore an object of the present invention is to provide an electric discharge machining apparatus which is capable of performing a stable machining process, manufacturing a tool electrode material with a low cost, and substantially preventing the consumption of the electrode.

To solve the above problems, according to a first aspect of the invention, there is provided an electric discharge machining apparatus in which at least one of a tool electrode and a workpiece is made of an anisotropic conductive material, the electric discharge machining apparatus comprising, on a good conductive surface of the anisotropic conductive material, a portion for connecting an isotropic conductive member.

According to a second aspect of the invention, there is provided an electric discharge machining apparatus of the first aspect of the invention, wherein electric discharge is generated on the good conductive surface of the anisotropic conductive material.

According to a third aspect of the invention, there is provided an electric discharge machining apparatus of the first aspect of the invention, wherein a conductive adhesive agent is employed to bond the anisotropic conductive material and the isotropic conductive member to each other.

According to a fourth aspect of the invention, there is provided an electric discharge machining apparatus of any one of the first to third aspects of the invention, wherein the anisotropic conductive material is a pyrocarbon material.

According to a fifth aspect of the invention, there is provided an electric discharge machining apparatus of the fourth aspect of the invention, wherein the pyrocarbon material is employed as a tool electrode material.

According to a sixth aspect of the invention, there is provided an electric discharge machining apparatus of the fifth aspect of the invention, wherein incombustible dielectric fluid, such as pure water, is employed as dielectric fluid.

According to a seventh aspect of the invention, there is provided an electric discharge machining apparatus of the first aspect of the invention further comprising discharge voltage measuring means for measuring voltage during electric discharge, reference voltage setting means for setting a threshold value for use to determine whether the electric discharge is normal electric discharge for abnormal electric discharge and comparison means for interrupting supply of a discharge current in a case where the measured discharge voltage is higher than the threshold value.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the invention with reference to the accompanying drawings.

(First Embodiment)

Initially, the pyrocarbon material will now be described.

Figure 1:
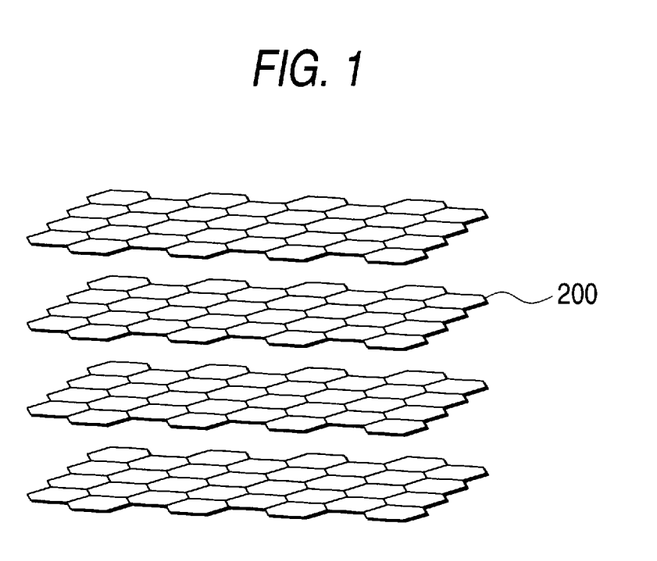
FIG. 1 is a diagram showing the structure of crystal of graphite according to a first embodiment of the invention.
Figure 2:
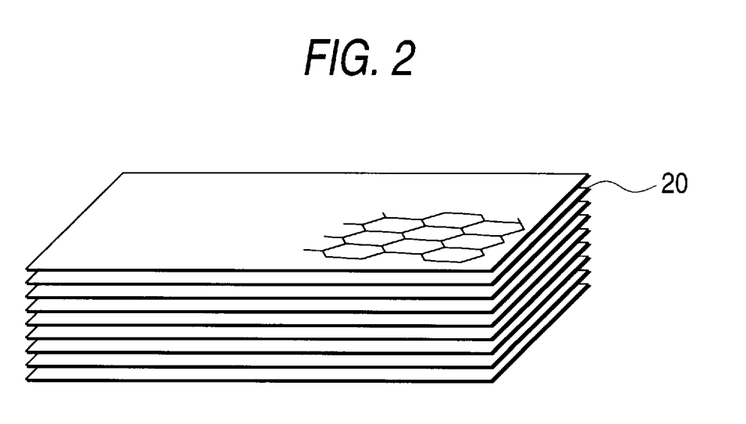
FIG. 2 is a diagram showing the structure of a pyrocarbon material according to the first embodiment.
Figure 3:
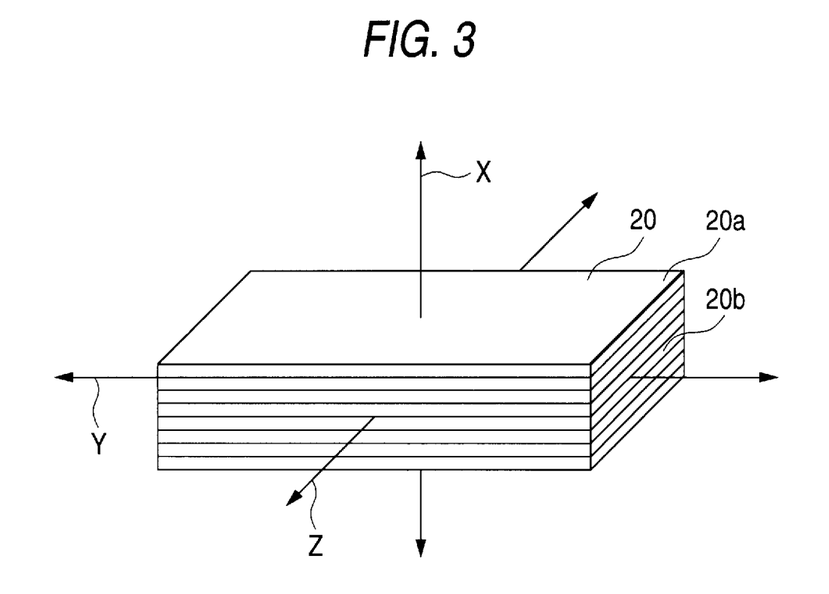
FIG. 3 is a diagram showing the anisotropy of the pyrocarbon material according to the first embodiment.

As well known, graphite consists of many carbon atom layers 200, in each of which a carbon atom is located at each apex of a regular hexagon, as shown in FIG. 1. Similarly, when pyrocarbon atoms are deposited on a substrate by vapor deposition method, many carbon atom layers are also laminated like graphite (see FIG. 2). In order to describe the structure easily, the laminated carbon atom layers 200 are called laminated layers 20, end surfaces running parallel to the laminated layers 20 are called poor conductive surfaces 20a and end surfaces crosscutting the laminated layers 20 are called good conductive surfaces 20b hereinafter. When they are illustrated, plural laminated layers 20 are illustrated as shown in FIG. 3 so as to distinguish the poor conductive surfaces 20a and the good conductive surfaces 20b.

Since the pyrocarbon material has anisotropic structure as described above, this material has extreme anisotropic heat conductivity and electric conductivity. That is, referring to FIG. 3, the electric and heat conductivity in directions (indicating by arrows Y and Z) running parallel to the laminated layers 20 is more than 100 times the conductivity in a direction (indicated by an arrow X) across the laminated layers 20. In addition, the conductivity along Y and Z directions are comparable to those of metallic materials. Therefore, heat and electricity are conducted among good conductive surfaces 20b comparably to metals, while conduction is substantially inhibited between the poor conductive surfaces 20a and the good conductive surfaces 20b.

It should be noted that an isotropic graphite electrode, which has been commonly used in the conventional electric discharge machining, and whose electric and heat conductivity is much less than that of metal, does not exhibit the foregoing anisotropy.

It should also be noted that the cost of the pyrocarbon material is very high because this material grows very slow in the vapor deposition process.

The structure and operation of this embodiment will now be described.

Figure 4:
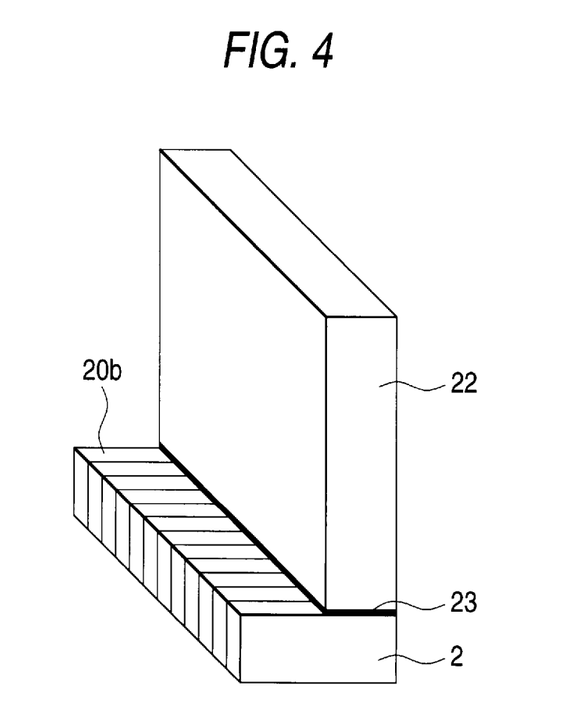
FIG. 4 is a diagram showing the structure of an electrode for an electric discharge machining process according to the first embodiment.
Figure 5:
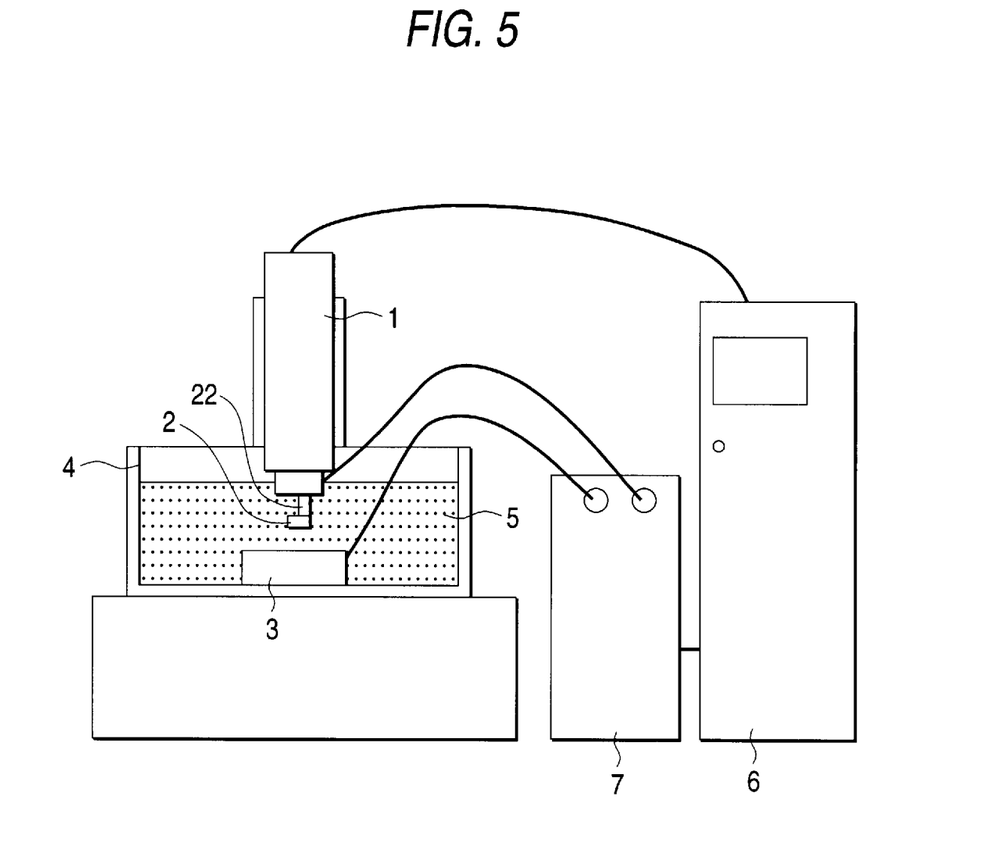
FIG. 5 is a diagram showing the structure of an electric discharge machining apparatus according to the first embodiment.

Initially, the electrode is constructed by bonding a copper pipe 22 which is an isotropic conductive member onto the good conductive surface 20b of the pyrocarbon material 2 using a conductive adhesive agent 23 as shown in FIG. 4. Then, as shown in FIG. 5, the constructed electrode is attached to the spindle 1 of an electric discharge machining apparatus. A workpiece 3 is located in the tank 4 filled with dielectric fluid 5. The control unit 6 controls the distance between the tool electrode and workpiece. Then, the electric discharges are caused by the machining power supply 7 so that the electric discharge machining process is performed.

As a result of the above-mentioned process, discharge current flows easily along the laminated layer 20 of the pyrocarbon material 2 through the copper pipe 22. Therefore, a stable machining process can be performed. Moreover, since the quantity of the costly pyrocarbon material 2 can be minimized, the tool electrode can be manufactured with low cost. Because most electric discharges occur on the good conductive surfaces 20b, heat generated on the electrode surface is quickly diffused in the electrode along the laminated layer 20. Therefore, the surface of the electrode can be cooled rapidly so that the consumption of the electrode is substantially prevented.

Table 1 shows results using the electrode according to this embodiment and using the conventional isotropic graphite electrode under the same condition of reverse polarity, peak current of 5.5A and pulse width of 4 microseconds. As can be seen from the table, the consumption ratio of this embodiment was decreased to about 1/100 as compared with the isotropic graphite electrode. In these experiments, the machining stability of this embodiment was observed to be comparable to that of the conventional method.

TABLE 1

| Material of Electrode | Electrode Consumption Ratio |
| --- | --- |
| Isotropic Graphite | 50.0% |
| Heat resolved carbon material | 0.57% |

Hitherto, it is said that forming a protective carbon coating on the electrode surface is necessary for the low electrode consumption process and long pulse width which is not shorter than 100 microseconds must be employed in order to form the protective coating. However, as can be seen from the above-mentioned experiment, the electrode according to this embodiment performs low electrode consumption even if short pulse widths are employed. It is assumed by these results that the low consumption process without the protective carbon coating can be performed in this embodiment. This assumption can be also confirmed from the similar experimental results using incombustible dielectric fluid on the market and pure water as the dielectric fluid. In addition, it is evident that the machining speed can be raised because shorter pulse width can be employed for the same surface roughness. Moreover, this method is also advantageous in preventing disaster because low electrode consumption process can be performed with water-based dielectric fluid.

Although the above-mentioned embodiment has the structure such that the pyrocarbon material 2 and the copper pipe 22 are connected to each other by using the conductive adhesive agent 23, another method, such as soldering, brazing or bolt fixing, may be employed to establish the electrical connection. When the connection is performed after a portion or the entire surface of the feasible conductive surface 20b has been plated with nickel or the like, the electrical connection can be established furthermore reliably.

Although the foregoing embodiment has the structure such that copper, which is a common material for manufacturing the tool electrode, is employed to manufacture the isotropic conductive member 22, the material is not limited to this. Other materials, such as aluminum, steel, brass, copper tungsten, superhard alloy and boron nitride, may be employed. An isotropic graphite, which has been employed in the conventional electric discharge machining, may also be employed. That is, any one of usual isotropic conductive materials may be employed to obtain the effect of the present invention.

Although the above-mentioned embodiment has the structure such that the pyrocarbon material 2 is employed as the tool electrode material, the present invention may be applied to a structure in which this material is employed as the material for the workpiece 3. Since the present invention can widely be employed to perform a stable electric discharge machining using the anisotropic material, the anisotropic conductive material is not limited to the pyrocarbon material 2. The present invention may be applied to a variety of anisotropic conductive materials, such as single-crystal graphite.

(Second Embodiment)

The structure and operation will now be described.

Figure 6:
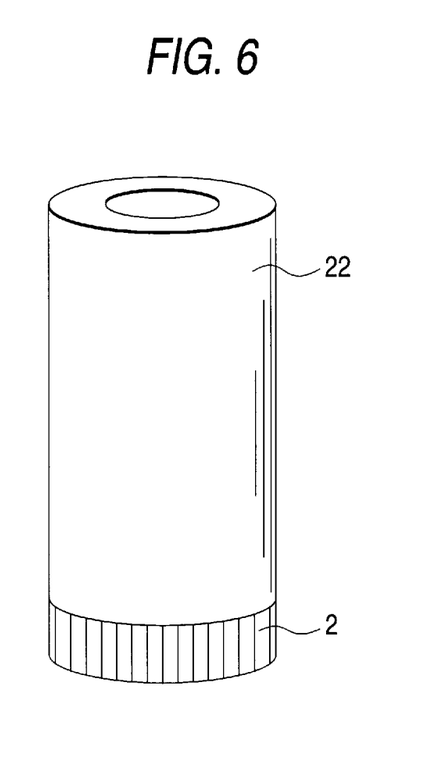
FIG. 6 is a diagram showing the structure of an electrode for an electric discharge machining process according to a second embodiment of the invention.
Figure 7:
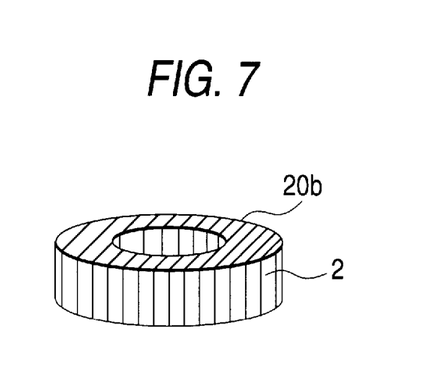
FIG. 7 is a diagram showing a posture of a pyrocarbon material according to the second embodiment.
Figure 8:
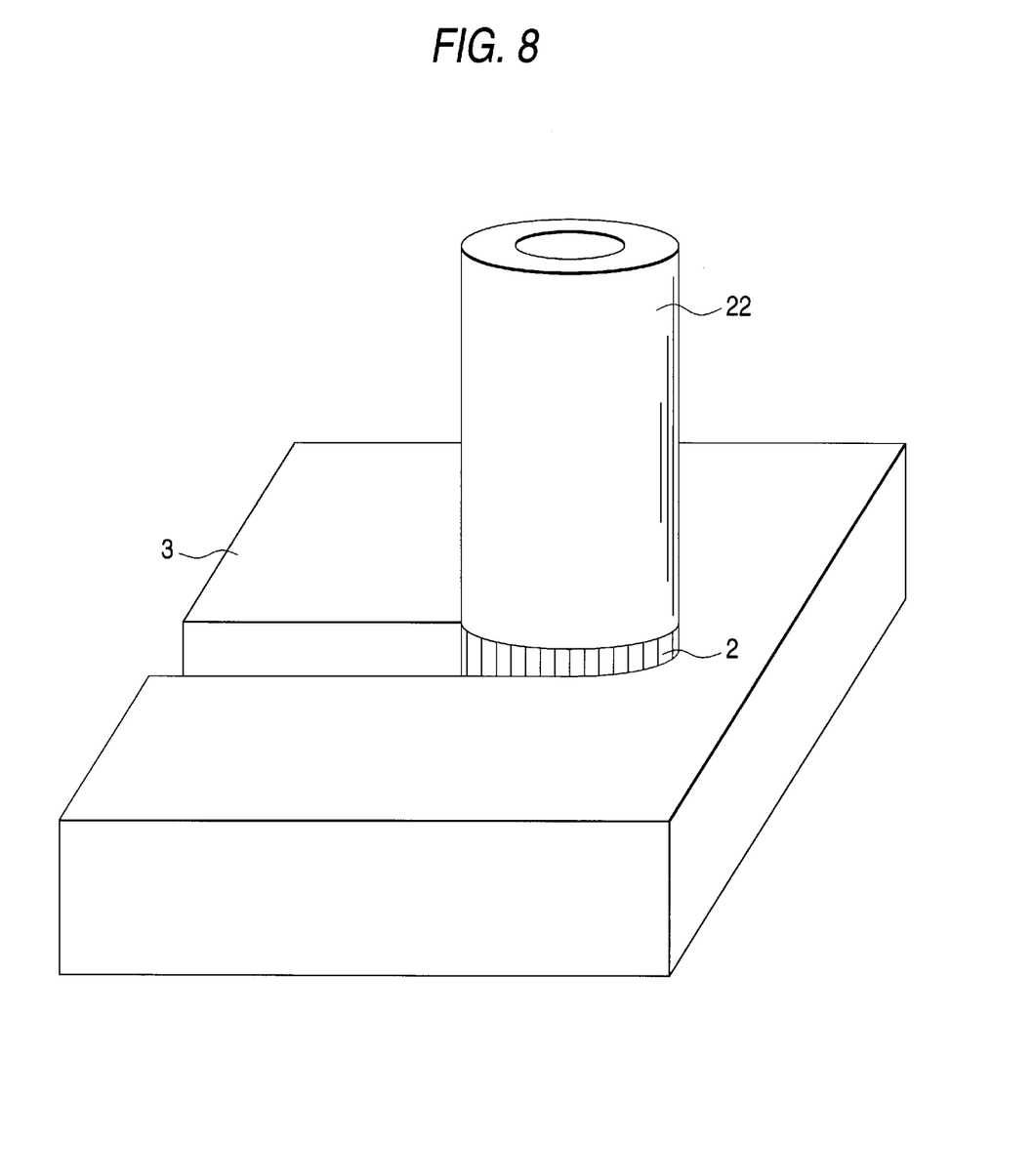
FIG. 8 is a diagram showing an arrangement of the machining process according to the second embodiment.

As shown in FIG. 6, a tool electrode is manufactured in which the pyrocarbon material 2 is connected to the leading end of a copper pipe 22. At this time, the pyrocarbon material 2 is placed in a posture shown in FIG. 7. Then, as shown in FIG. 8, the manufactured tool electrode is rotated and moved so that the electric discharge machining process is performed at the leading end of the tool electrode, at which the pyrocarbon material 2 is located.

Even if the electrode is structured as described above, the good conductive surface 20b of the pyrocarbon material 2 is connected to the copper pipe 22, and the electric discharges take place on the feasible conductive surface 20b. Therefore, an effect similar to that obtainable from the first embodiment can be obtained. In addition, if a structure is employed in which dielectric fluid is made flow through the inside portion of the tubular electrode, the machining performance can furthermore be improved.

Although the tubular electrode is employed in the above-mentioned embodiment, another shape, such as cylindrical shape without through hole, may also be employed as a shape of a copper pipe 22 and/or the pyrocarbon material 2.

Similarly to the first embodiment, the material of the isotropic conductive member 22 is not limited to the copper.

(Third Embodiment)

The structure and operation will now be described.

Figure 9:
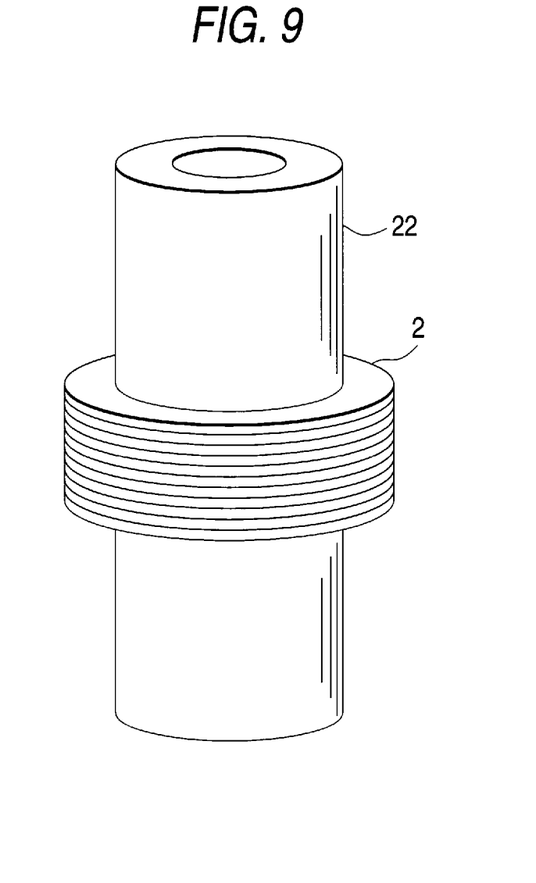
FIG. 9 is a diagram showing the structure of an electrode for an electric discharge machining process according to a third embodiment of the invention.
Figure 10:
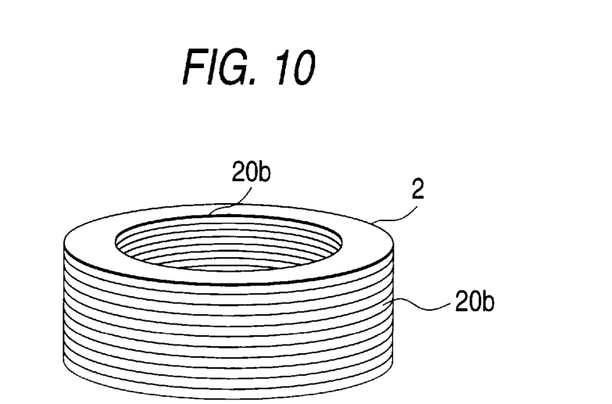
FIG. 10 is a diagram showing a posture of a pyrocarbon material according to the third embodiment.
Figure 11:
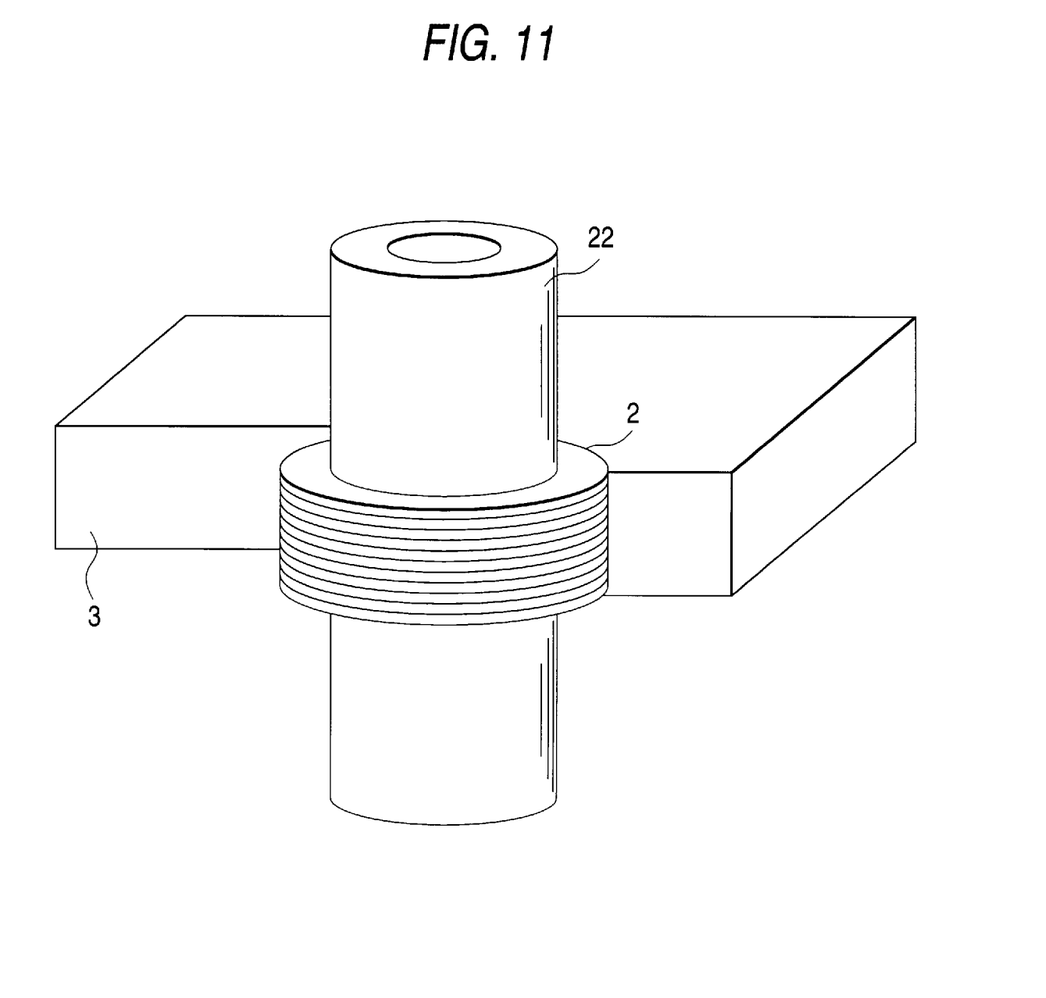
FIG. 11 is a diagram showing an arrangement of a machining process according to the third embodiment.

As shown in FIG. 9, a tool electrode is manufactured which has a structure such that a tubular pyrocarbon material 2 is connected to the outer surface of a copper pipe 22. At this time, the pyrocarbon material 2 is placed in a posture shown in FIG. 10. Then, the manufactured tool electrode is, as shown in FIG. 11, rotated and moved to perform the electric discharge machining process on the outer surface of the pyrocarbon material 2.

Even if the electrode is structured as described above, the good conductive surface 20b of the pyrocarbon material 2 is connected to the copper pipe 22, and the electric discharges take place on the feasible conductive surface 20b. Therefore, an effect similar to that obtainable from the first embodiment can be obtained. In addition, if a structure is employed in which dielectric fluid is made flow through the inside portion of the tubular electrode, the machining performance can furthermore be improved.

Figure 12:
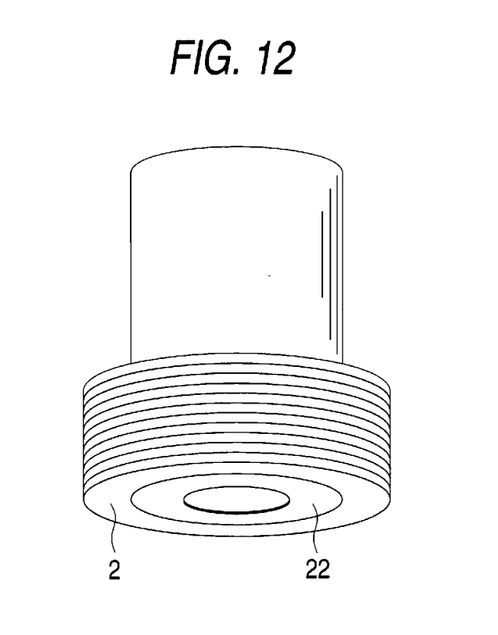
FIG. 12 is a diagram showing another example of the structure of the electrode for an electric discharge machining process according to the third embodiment.
Figure 13:
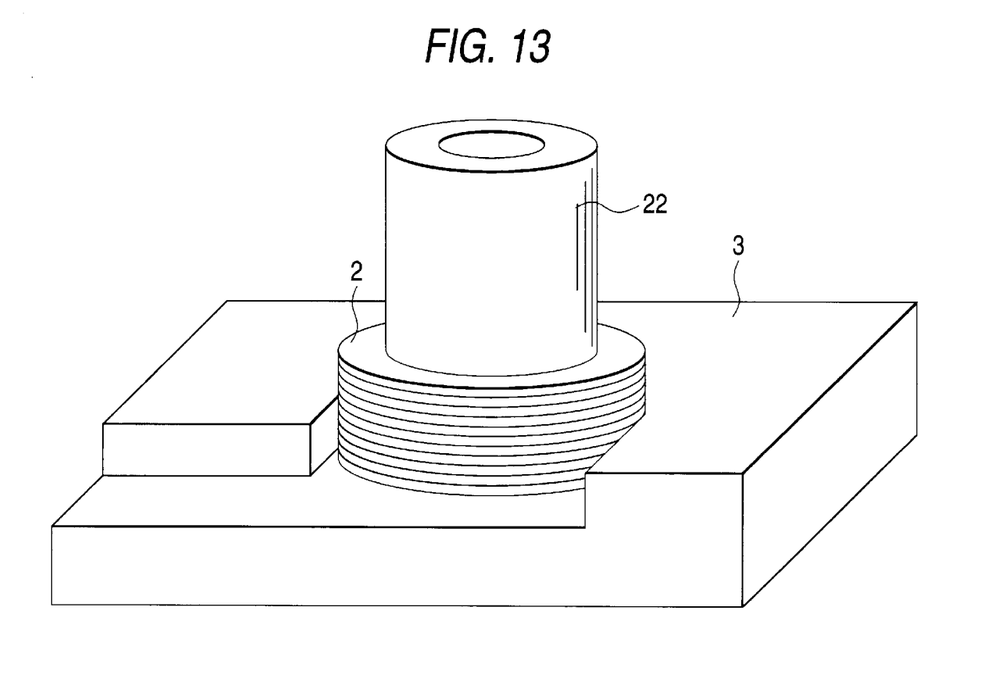
FIG. 13 is a diagram showing an arrangement of a process using the electrode for an electric discharge machining process shown in FIG. 12 and according to the third embodiment.

Although the above-mentioned embodiment has the structure such that the copper pipe 22 penetrates the pyrocarbon material 2, a structure as shown in FIG. 12 may be employed in which the copper pipe 22 is inserted in such a manner that the bottom surface of the copper pipe 22 is placed on the same plane as the bottom surface of the heat resolved carbon material 2. In this case, grooving and pocketing processes as shown in FIG. 13 can be performed as well as the profiling process as shown in FIG. 11.

Figure 14:
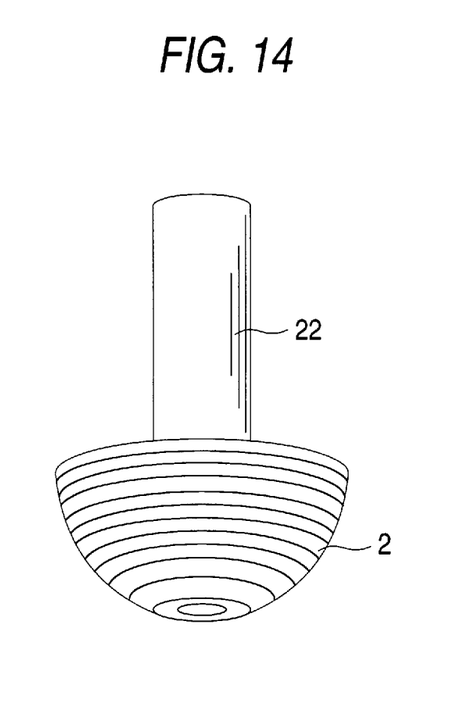
FIG. 14 is a diagram showing another example of the structure of the electrode for an electric discharge machining process according to the third embodiment.

Although the foregoing embodiment has the structure such that the pyrocarbon material 2 is in the tubular shape, the shape is not limited to this. For example, the shape of the leading end may be formed into spherical shape as shown in FIG. 14. That is, the pyrocarbon material 2 may be formed variously to perform the grooving, pocketing and profiling processes.

Although the tubular copper pipe 22 is employed in the above-mentioned embodiment, a cylindrical copper rod having no through hole may be employed in place of the copper pipe 22.

Similarly to the first embodiment, the material of the isotropic conductive member 22 is not limited to the copper.

(Fourth Embodiment)

Initially, the tubularly laminated type pyrocarbon material will now be described.

Figure 15:
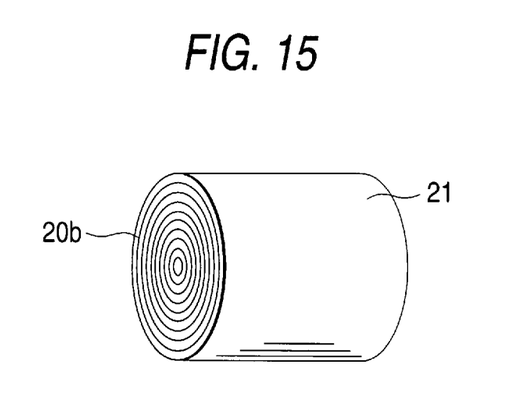
FIG. 15 is a diagram showing the structure of the tubularly laminated type pyrocarbon material according to a fourth embodiment of the invention.

In each of the first to third embodiments, the pyrocarbon material 2 has flat laminated layers. In this embodiment, however, a material which has concentrically and cylindrically laminated layers as shown in FIG. 15 is employed. This material is called a tubularly laminated type pyrocarbon material 21 hereinafter. This material is made by depositing the pyrocarbon atom around the core member which consists of carbon fibers. As can be seen from the shape of the laminated layers, the heat conductivity and electric conductivity of this material in the axial direction are extremely higher than those in the radial direction.

The structure and operation of this embodiment will now be described.

Figure 16:
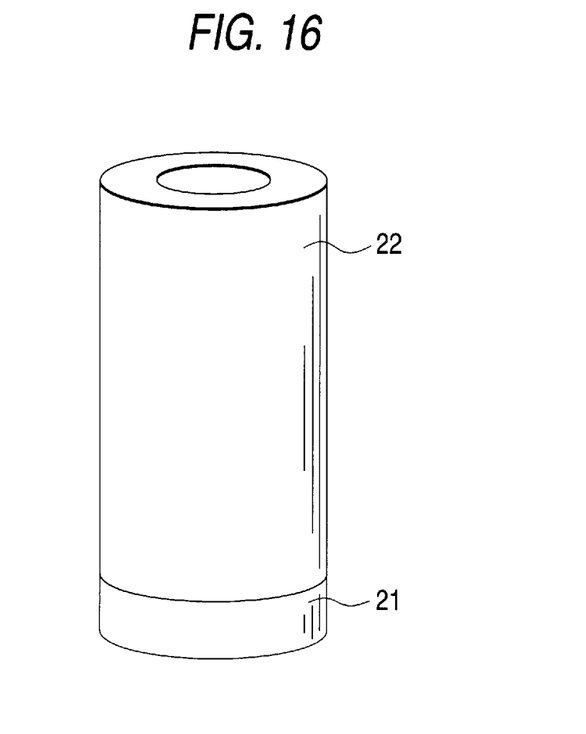
FIG. 16 is a diagram showing the structure of the electrode for an electric discharge machining process according to the fourth embodiment of the invention.
Figure 17:
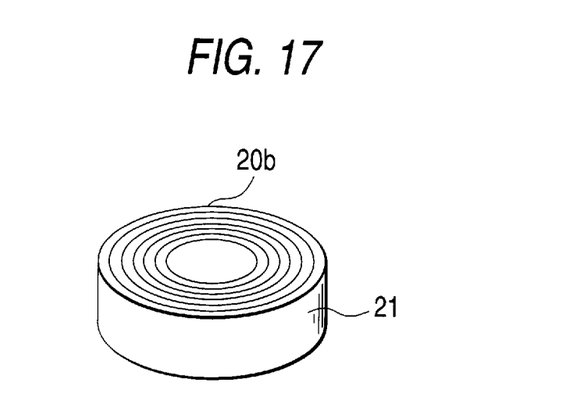
FIG. 17 is a diagram showing a posture of a pyrocarbon material according to the fourth embodiment.
Figure 18:
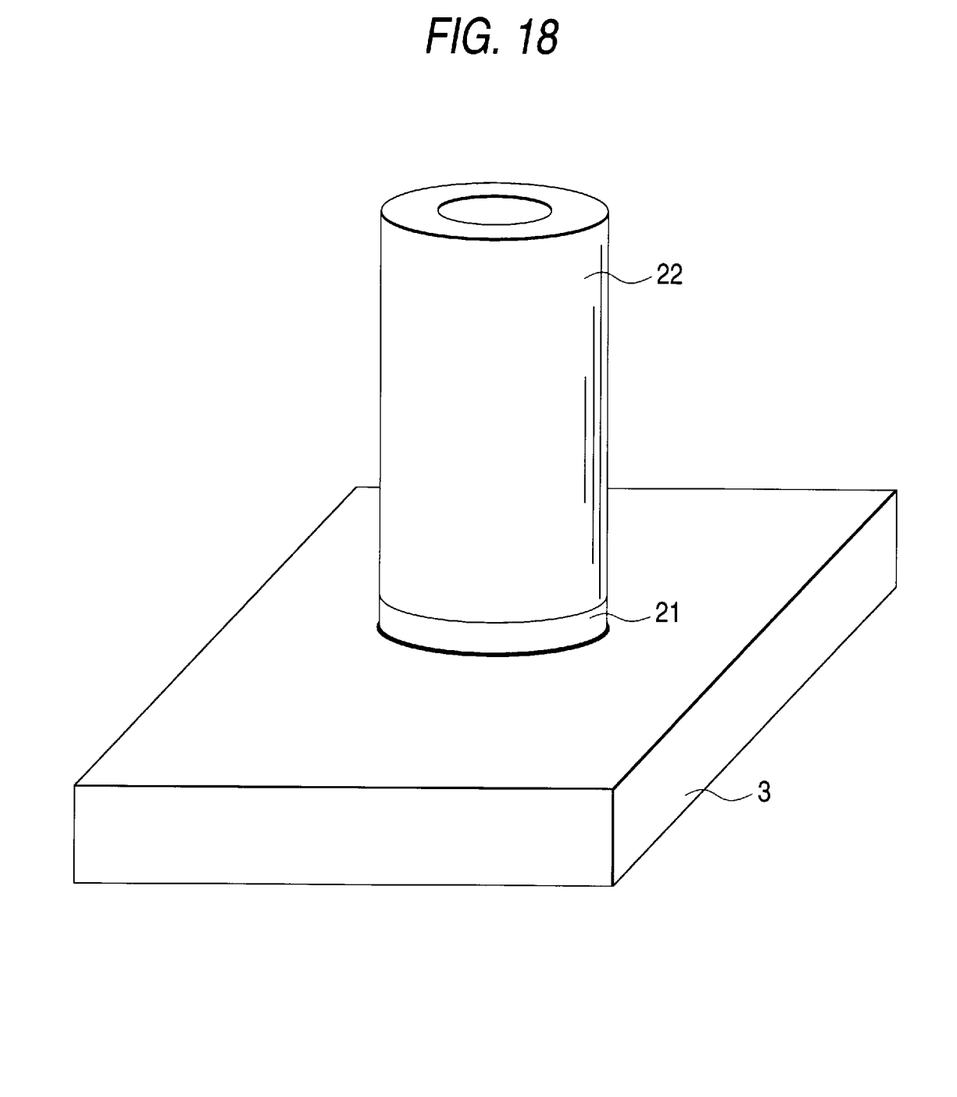
FIG. 18 is a diagram showing an arrangement of a machining process according to the fourth embodiment.

As shown in FIG. 16, the tubularly laminated type pyrocarbon material 21 is connected to the leading end of a copper pipe 22. At this time, the tubularly laminated type pyrocarbon material 21 is placed in a posture shown in FIG. 17. Then, as shown in FIG. 18, the electric discharge machining process is performed at the leading end, at which the tubularly laminated type pyrocarbon material 21 is placed.

Even if the electrode is structured as described above, the feasible conductive surface 20b of the tubularly laminated type pyrocarbon material 21 is connected to the copper pipe 22, and the electric discharges take place on the good conductive surface 20b. Therefore, an effect similar to that obtainable from the first embodiment can be obtained. This construction of the tool electrode is suitable for machining along the axial direction. In addition, if the electrode is rotated or dielectric fluid is made flow through the inside portion of the electrode, the machining performance can furthermore be improved.

Although the above-mentioned embodiment has the structure such that the cylindrical electrode is employed, the copper pipe 22 and/or tubularly laminated type pyrocarbon material 21 may be formed into another shape such as cylindrical shape having no through hole, rotationally asymmetric shape and so on.

Similarly to the first embodiment, the material of the isotropic conductive member 22 is not limited to the copper.

(Fifth Embodiment)

Initially, the background of this embodiment will now be described.

As described above, the pyrocarbon material has extreme anisotropy. When a grooving or pocketing process as shown in FIG. 13 is performed for example, the electric resistance running parallel in the axial direction of the electrode is considerably larger than the electric resistance in the radial direction of the electrode. Therefore, electric discharge takes place uncommonly in the axial direction. However, if electric discharge in the axial direction takes place, the great electric resistance generates excessive heat in the electrode and thus the electrode will be broken.

The electric discharge in the axial direction is characterized the great voltage drop in the electrode. Therefore, the higher discharge voltage is measured as compared with usual electric discharge. If the machining power supply uses resistances in order to limit the discharge current, a low discharge current is also measured as compared with the normal discharge. If the machining power supply changes its internal impedance to regulate the discharge current to a predetermined amount by feedback control, the internal impedance is set to be lower as compared with the normal discharge. The present invention uses the above-mentioned characteristics to detect unintentional occurrence of the foregoing discharge and immediately interrupts the electric discharge in order to protect the electrode from damage.

The structure and operation of this embodiment will now be described.

Figure 19:
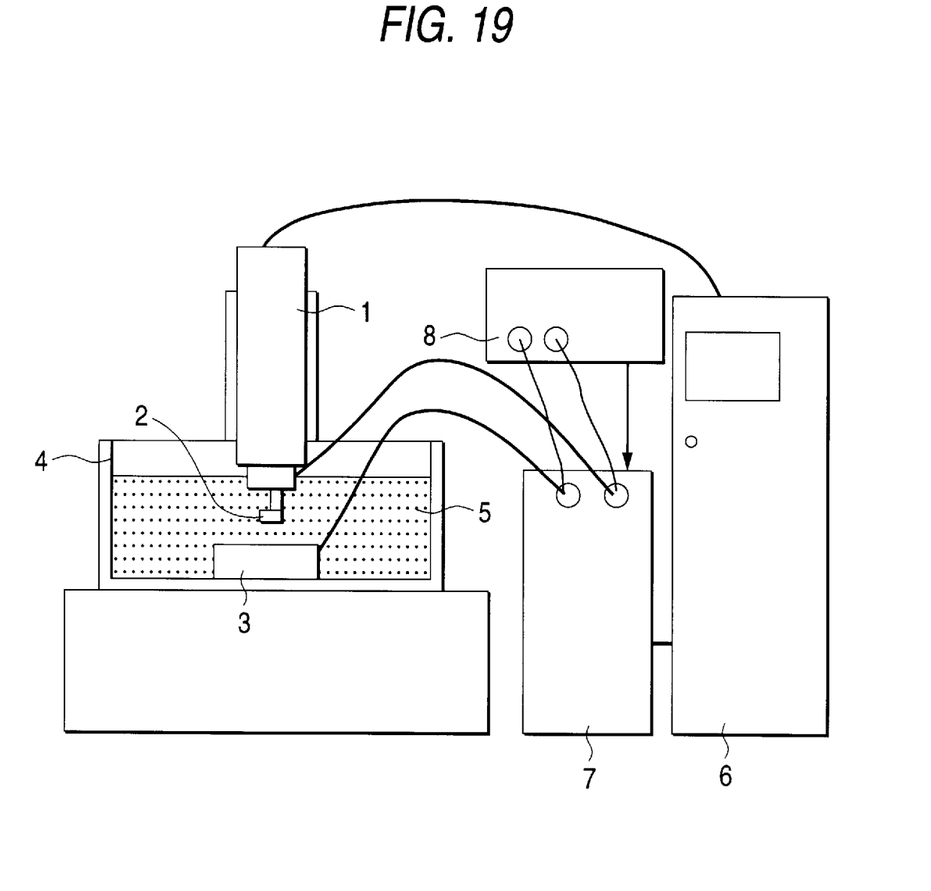
FIG. 19 is a diagram showing the structure of an electric discharge machining apparatus according to a fifth embodiment of the invention.
Figure 20:
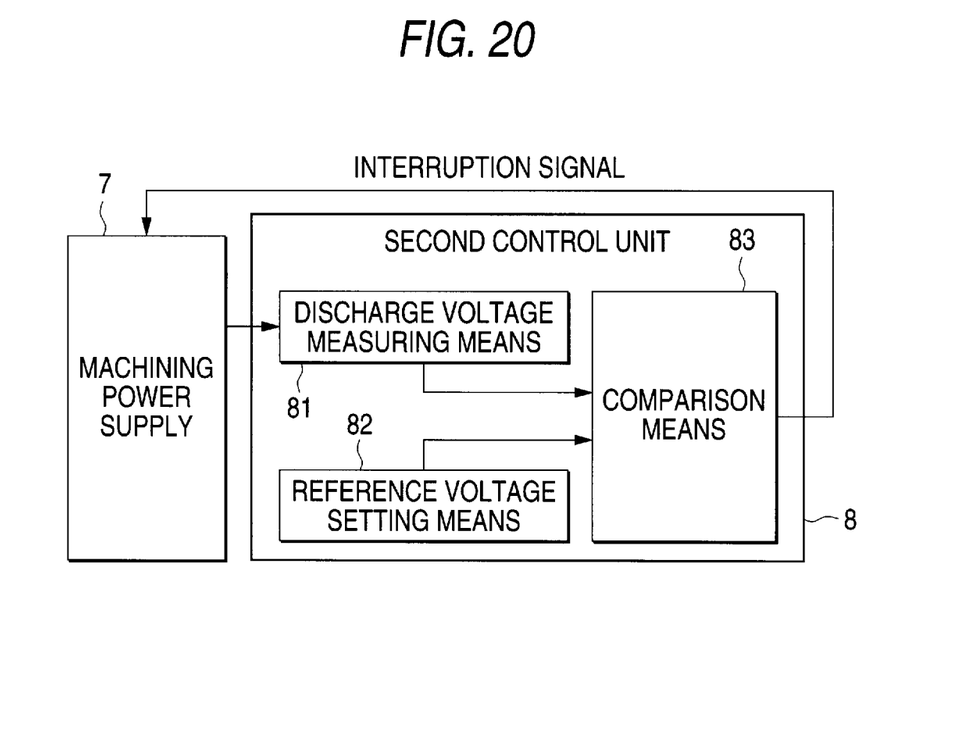
FIG. 20 is a diagram showing an example of the structure of a second control unit according to the fifth embodiment.

This embodiment has a structure such that a second control unit 8 for controlling the machining power supply 7 is provided (see FIG. 19) in addition to the structure (see FIG. 5) according to the foregoing embodiment. An example of the structure of the second control unit 8 is shown in FIG. 20. The operation will now be described.

The second control unit 8 consists of a discharge voltage measuring means 81, a reference voltage setting means 82 and a comparison means 83. The reference voltage setting means 82 has a threshold value (about 30 V if the workpiece 3 is steel) previously set to be somewhat higher than the normal discharge voltage. The discharge voltage measuring means 81 measures the voltage between the tool electrode and the workpiece 3 during the electric discharge after the occurrence of the electric discharge has been detected. The comparison means 83 compares the measured discharge voltage and the threshold value in order to issue a command to interrupt the discharge current to the machining power supply 7 if the discharge voltage is larger than the threshold value.

As described above, according to this embodiment, if an abnormal electric discharge whose discharge voltage is higher than the normal discharge takes place, the discharge current is immediately interrupted. Therefore, the occurrence of the undesirable discharge can be prevented. Thus the electrode can be protected from being damaged.

Although the discharge voltage is measured in the foregoing embodiment, the discharge current or the internal impedance of the power supply may be employed as can be understood from the description of the background.

Figure 21:
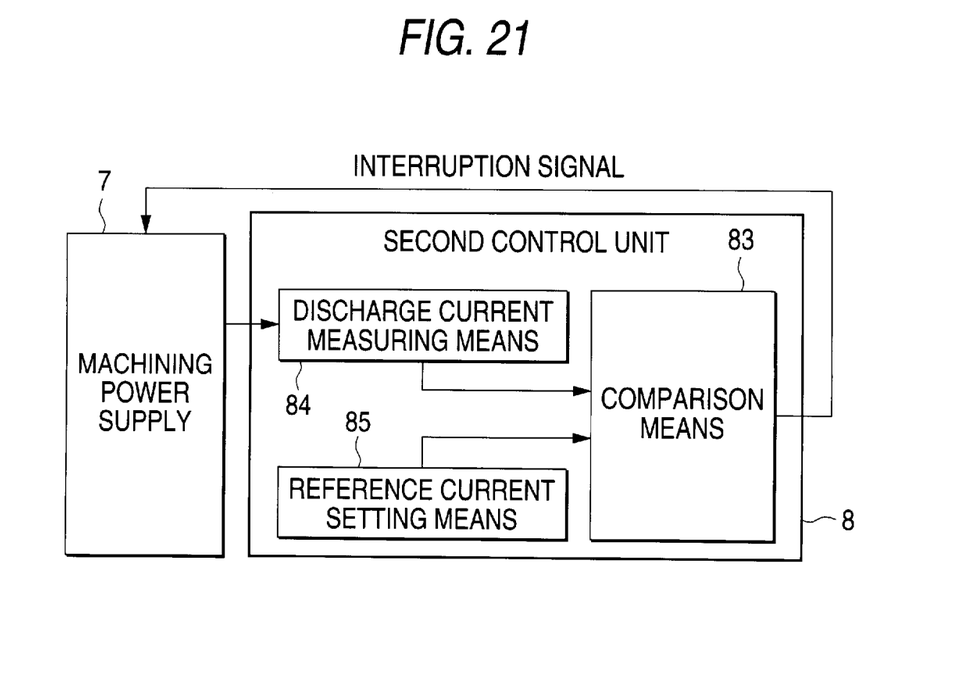
FIG. 21 is a diagram showing another example of the structure of the second control unit according to the fifth embodiment.

FIG. 21 is a diagram showing another example of the structure of the second control unit 8 which measures the discharge current. It comprises a discharge current measuring means 84, a reference current setting means 85 and a comparison means 83. Since the operation is similar to that of the structure shown in FIG. 20, description of the operation is omitted.

As described above, according to the electric discharge machining apparatus of the present invention in which at least one of the tool electrode and the workpiece is made of the anisotropic conductive material, there is provided on the good conductive surface of the anisotropic conductive material, the portion for connecting an isotropic conductive member. Therefore, the discharge current is able to flow easily from the anisotropic conductive material to the isotropic conductive member. Thus, the electric resistance can be reduced and therefore the machining process can be stabilized.

Also, according to the electric discharge machining apparatus of the present invention, electric discharges are generated on the good conductive surface of the anisotropic conductive material. Therefore, heat generated by the electric discharge is able to diffuse quickly into the inside portion of the electrode. Thus, the discharged surface can be cooled and consumption of the electrode can be prevented.

Further, according to the electric discharge machining apparatus of the present invention, the conductive adhesive agent is employed to bond the anisotropic conductive material and the isotropic conductive member to each other. Therefore, the mutual electric connection can easily and reliably be established.

Still further, according to the electric discharge machining apparatus of the present invention, the anisotropic conductive material is the pyrocarbon material. Therefore, the costly pyrocarbon material can be minimized and thus the electrode can be manufactured with a low cost.

Yet still further, according to the electric discharge machining apparatus of the present invention, the pyrocarbon material is employed as a tool electrode material. Therefore, the electric discharge machining process can be performed while substantially preventing consumption of the electrode.

Yet still further, according to the electric discharge machining apparatus of the present invention, incombustible dielectric fluid such as pure water is employed as dielectric fluid. Therefore, a risk of ignition can be eliminated.

Yet still further, according to the electric discharge machining apparatus of the present invention, there is further provided the discharge voltage measuring means for measuring voltage during electric discharge, the reference voltage setting means for setting a threshold value for use to determine whether the electric discharge is normal electric discharge or abnormal electric discharge and the comparison means for interrupting supply of a discharge current in a case where the measured discharge voltage is higher than the threshold value. Therefore, occurrence of abnormal electric discharge can be detected to immediately interrupt the electric discharge in order to protect the electrode from being damaged.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claim is:

1. An electric discharge machining apparatus, comprising:
   a tool electrode made of an anisotropic conductive material; and
   an isotropic conductive member;
   wherein said isotropic conductive member is connected to a conductive surface of said anisotropic conductive material.

2. An electric discharge machining apparatus according to claim 1, wherein electric discharge is generated at said conductive surface of said anisotropic conductive material.

3. An electric discharge machining apparatus according to claim 1, further comprising a conductive adhesive for bonding said anisotropic conductive material and said isotropic conductive member to each other.

4. An electric discharge machining apparatus according to claim 1, wherein said anisotropic conductive material comprises a pyrocarbon material.

5. An electric discharge machining apparatus according to claim 4, wherein said pyrocarbon material is employed as a tool electrode material.

6. An electric discharge machining apparatus according to claim 5, wherein an incombustible fluid is employed as the dielectric fluid.

7. An electric discharge machining apparatus according to claim 1, further comprising:
 a discharge voltage measuring device for measuring voltage during electric discharge;
 a reference voltage setting device for setting a threshold value used to determine whether the electric discharge is a normal electric discharge or an abnormal electric discharge; and
 a comparator for interrupting a supply of a discharge current when the measured discharge voltage is higher than said threshold value.

8. An electric discharge machining apparatus, comprising:
 an isotropic conductive member having a cylindrical shape; and
 an anisotropic conductive tool electrode having a cylindrical shape, and having a conductive surface connected around an outer surface of said isotropic conductive member.

9. An electric discharge machining apparatus according to claim 8, wherein a bottom surface of said isotropic conductive member is positioned in the same plane as the bottom surface of said anisotropic conductive tool electrode.

10. An electric discharge machining apparatus according to claim 8, wherein a leading end of said anisotropic conductive tool electrode is formed in a spherical shape.

11. An electric discharge machining apparatus according to claim 8, wherein said isotropic conductive member has a through-hole.

12. An electric discharge machining apparatus, comprising:
 an isotropic conductive member having a cylindrical shape; and
 an anisotropic conductive tool electrode having concentrically and cylindrically laminated layers, and having a conductive surface connected to an end surface of said isotropic conductive member.

13. An electric discharge machining apparatus, comprising:
 a tool electrode, having a cylindrical shape and a through-hole, and being made of an anisotropic conductive material; and
 an isotropic conductive member having a cylindrical shape and a through-hole;
 wherein said isotropic conductive member is connected to a conductive surface of said anisotropic conductive material, and the through-holes of said tool electrode and said isotropic conductive member are contiguous so as to conduct a dielectric fluid therethrough.

* * * * *